(12) United States Patent
Cha et al.

(10) Patent No.: US 7,428,408 B2
(45) Date of Patent: Sep. 23, 2008

(54) METHOD FOR OPERATING A SMART ANTENNA IN A WLAN USING MEDIUM ACCESS CONTROL INFORMATION

(75) Inventors: Inhyok Cha, Melbourne, FL (US); Yingxue Li, King of Prussia, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 348 days.

(21) Appl. No.: 11/228,816

(22) Filed: Sep. 16, 2005

(65) Prior Publication Data

US 2006/0079220 A1    Apr. 13, 2006

Related U.S. Application Data

(60) Provisional application No. 60/611,337, filed on Sep. 20, 2004.

(51) Int. Cl.
*H04B 1/06* (2006.01)
(52) U.S. Cl. .............. 455/275.1; 455/277.1; 455/452.1; 343/372; 343/702; 370/329
(58) Field of Classification Search ............. 455/275.1, 455/277.1, 277.2, 452.1, 452.3, 13.3, 8–10, 455/41.2, 41.1, 276.1, 67.11, 67.13; 343/702, 343/833, 834
See application file for complete search history.

(56) References Cited

U.S. PATENT DOCUMENTS

| | | | |
|---|---|---|---|
| 3,846,799 A | 11/1974 | Gueguen | 343/833 |
| 5,905,473 A | 5/1999 | Taenzer | 343/834 |
| 7,076,168 B1 * | 7/2006 | Shattil | 398/76 |
| 7,103,386 B2 * | 9/2006 | Hoffmann et al. | 455/562.1 |
| 7,116,726 B2 * | 10/2006 | Winkler | 375/296 |
| 2004/0002357 A1 | 1/2004 | Benveniste | 455/550.1 |

(Continued)

FOREIGN PATENT DOCUMENTS

WO    WO 02/19740    3/2002

(Continued)

OTHER PUBLICATIONS

Ohira et al., Electronically Steerable Passive Array Radiator Antennas for Low-Cost Analog Adaptive Beamforming, 0-7803-6345-0/00, 2000, IEEE.

(Continued)

*Primary Examiner*—Tony T. Nguyen
(74) *Attorney, Agent, or Firm*—Allen, Dyer, Doppelt, Milbrath & Gilchrist, P.A.

(57) ABSTRACT

A communications device with a switched beam antenna operates in a wireless local area network (WLAN) that includes a plurality of transmitters. The switched beam antenna generates a plurality of antenna beams. A method for operating the communications device includes receiving signals from the plurality of transmitters operating within the WLAN, identifying the received signals comprising medium access control (MAC) information, and determining a quality metric for each received signal comprising MAC information. A transmitter is selected based on the quality metrics. The antenna beams are scanned for receiving from the selected transmitter the signals comprising MAC information. A quality metric associated with each scanned antenna beam is determined. One of the scanned antenna beams is then selected for communicating with the selected transmitter based on the quality metrics.

18 Claims, 7 Drawing Sheets

U.S. PATENT DOCUMENTS

2004/0114535 A1    6/2004    Hoffmann et al. ........... 370/252
2005/0075140 A1    4/2005    Famolari ................. 455/562.1

FOREIGN PATENT DOCUMENTS

WO    WO 03/023895    3/2003
WO    WO03/107577    12/2003

OTHER PUBLICATIONS

Scott et al., Diversity Gain From a Single-Port Adaptive Antenna Using Switched Parasitic Elements Illustrated with a Wire and Monopole Prototype, IEEE Transactions on Antennas and Propagation, vol. 47, No. 6, Jun. 1999.

King, The Theory of Linear Antennas, pp. 622-637, Harvard University Press, Cambridge, Mass., 1956.

Lo et al., Antenna Handbook: Theory, Applications and Design, pp. 21-38, Van Nostrand Reinhold Co., New York, 1988.

IEEE standard for information technology - telecommunications and information exchange between systems - local and metropolitan area networks - specific requirements. Part II: wireless LAN medium access control (MAC) and physical layer (PHY) specifications. (ISO/IED 8802-11 ANS/IEEE STD 802.11, ANSI/IEEE 8802-11 ANSI/IEEE STD 802.11) Aug. 20, 1999, pp. 1, 34-58, XP002206839.

\* cited by examiner

METHOD FOR OPERATING A SMART ANTENNA IN A WLAN USING MEDIUM ACCESS CONTROL INFORMATION

RELATED APPLICATION

This application claims the benefit of U.S. Provisional Application Ser. No. 60/611,337 filed Sep. 20, 2004, the entire contents of which are incorporated herein by reference.

FIELD OF THE INVENTION

The present invention relates to the field of wireless communications, and more particularly, to a smart antenna for use with a wireless communications device.

BACKGROUND OF THE INVENTION

In wireless communications systems, communications devices may include a smart antenna that generates a plurality of directional antenna beams. Traditional methods for steering the directional antenna beams when operating in a wireless local area network (WLAN) are based on measuring raw signal strength that is received at the physical layer (PHY). Typically, the communications device attempts to steer the directional antenna beams to the direction where, for a certain measurement time interval, the average received signal strength is maximized.

A disadvantage is that the communications device blindly maximizes the received signal strength without identifying the source of the signals. In a more intelligent scheme, the communications device listens to the broadcast signals transmitted either periodically or quasi-periodically by the central access coordinator of the network, i.e., an access point (AP) or base station. The broadcast signals include beacon frames, for example.

The communications device steers a directional antenna beam to the direction where the strength of the signal received from the beacon frames is maximized. In this case, the station relies on the periodicity information regarding the time of transmission of the broadcast beacon frames from the access points. The system also measures the received signal strengths of the beacon frames for different directional antenna beams. This measurement is performed by scanning the signal strength of each beam periodically to lock onto the beacon frame using knowledge of the periodic transmission time of the beacon frames from the access point.

There are problems with antenna beam steering methods based on medium access control (MAC) agnostic maximization of the received signal quality, such as the received signal strength indicator (RSSI) or the signal-to-noise ratio (SNR). It is typically difficult to measure PHY signal quality indicators accurately, and especially if the quality indicator of the signal-to-noise or interference ratio is poor. This is due to the fact that it is difficult at the receiver to know whether the currently received signal includes an undistorted signals plus random noise, or if the received signal itself is distorted and directional interference is also added in the received signal.

Even in more intelligent antenna beam steering methods based on listening to broadcast signals such as the beacon frame signals that are known to be transmitted from the access point at periodic or quasi-periodic time intervals, there are still problems. The period is either known or can be estimated, and the different antenna beams can be steered for measuring received beacon frame signal strength at different measurement intervals and then compared.

One of the problems is that the timing of the beacon frame signals is not known precisely since beacon frames are only quasi-periodic, and can be lost due to either poor reception environments or loss of the exact timing of the transmission of WLAN signals. Another problem with the current systems is the relative long time delay, typically on the order of 100 msec, which the communications device needs to wait to receive one beacon frame packet in a WLAN.

Since no more than one beacon frame packet can be received per antenna beam every 100 msec, and since reception of a number of packets is needed per antenna beam to ensure reliable measurement of signal strengths, it can take a long time, on the order of seconds or longer, for a sweeping search of "best antenna beams" to be performed if the beam search is purely relying on reception of beacon frames. For some applications where fast beam searching is necessary because the application cannot tolerate possible degradation in communications during a beam search (including beams that would result in poor communication), such long delays incurred by steering methods relying on periodic reception of packetized broadcast signals can be a significant problem.

For example, a problem arises when measurements of WLAN signals are made without intelligent use of the received MAC packet information. When MAC packet-wise information is not used, it becomes very difficult for the wireless LAN station to distinguish the preferred antenna beam directions as well as undesired antenna beam directions.

SUMMARY OF THE INVENTION

In view of the foregoing background, an object of the present invention is to reduce antenna steering problems using information contained in the MAC packets, both in the receive path as well as in the transmission path.

The present invention is a method for steering antenna beams in a smart antenna based system. The system can blindly maximize the reception energy of all frames received within measurement intervals. The system can also scan different antenna beams based on knowledge of the transmission timing of periodically transmitted signals from the access points.

The measurements of signal or link qualities are made concurrently with the identification and distinction of the different wireless local area network (WLAN) medium access control (MAC) packet addresses, as well as packet-wise measurement information of all received frames received within the measurement intervals. By using WLAN MAC packet-wise address and quality information, measurements of the signal or link qualities on different antenna beams are made faster and more accurately as compared with traditional methods relying on quality measurements that are agnostic of the MAC packet address and packet-wise quality information.

Also, the beam search pattern and shape may also be selectively shaped. In other words, antenna beams may be steered towards a desired source/target, away from undesired sources/targets, towards directions that balance the enhancement of communication link with the desired source/target, or suppression of links with undesired sources/targets, such as co-channel interfering Access Points (AP). The antenna beams are steered using appropriate MAC packet information.

One embodiment of the antenna steering logic is based on the quality metrics being passed from the MAC. These quality metrics include a Received Signal Indicator (RSSI), and transmitted-packet PHY RATE values indicating the transmission rate by which the current individual MAC packet was transmitted by the station employing the steering method.

Additional quality metrics include the transmitted-packet LENGTH values indicating the number of bytes contained in the data part of the MAC packet in each of the individual packets transmitted by the station employing the steering method, and the values of various 802.11 wireless LAN MAC-layer counters (referred to in the 802.11 standard as the dot11 counters) relevant to packets transmitted by the station that employs the steering method. All of these quality metrics are directly available in the MAC header.

In another embodiment, the WLAN station employs the steering method in accordance with the invention for transmitting data type packets to its desired destination station.

The transmit antenna steering logic involves quality metrics passed from the MAC and includes directly available MAC layer information such as the transmitted-packet PHY RATE values indicating the transmission rate by which the current individual MAC packet was transmitted by the station employing the steering method. The quality metrics also include the transmitted-packet LENGTH values indicating the number of bytes contained in the data part of the MAC packet in each of the individual packets transmitted by the station employing the steering method, and the values of various 802.11 wireless LAN MAC-layer counters.

Another embodiment involves the smart-antenna steering client station receiving signals from two different AP stations. A first station is located in a direction close to and opposite a direction of a second station, and the distance between a third station and the first station is less than that between second station and the first station. The smart-antenna steering station may steer receive antenna beams to minimize the energy from the second station. Minimizing the energy from the second station equivalently minimizes interference received by the first station, and results in an increased signal to interference and noise ratio (SINR).

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

The present invention is a method for steering smart antenna beams in a smart antenna based system. The system can blindly maximize the reception energy of all frames received within measurement intervals. The system can also scan different antenna beams based on knowledge of the transmission timing of periodically transmitted signals from the access points.

The measurements of signal or link qualities are made concurrently with the identification and distinction of the different wireless local area network (WLAN) medium access control (MAC) packet addresses, as well as packet-wise measurement information of all received frames received within the measurement intervals. By using WLAN MAC packet-wise address and quality information, measurements of the signal or link qualities on different antenna beams are made faster and more accurately as compared with traditional methods relying on quality measurements that are agnostic of the MAC packet address and packet-wise quality information.

Also, the beam search pattern is selectively shaped. This means that the antenna beams may be steered towards a desired source/target, away from undesired sources/targets, towards directions that balance the enhancement of the communication link with the desired source/target, or suppression of links with undesired sources/targets such as co-channel interfering Access Points (AP). The steering of antenna beams may be enabled using appropriate MAC packet information, as shown in FIG. 2.

According to 802.11 standards, each WLAN packet includes a MAC header, which may contain information of MAC addresses, including Basic Service Set Identification (BSSID), Source Address (SA), Destination Address (DA), Transmitting Station Address (TA) and Receiving station Address (RA). The MAC header may contain one or more addresses, depending on the packet type.

Figure 1:
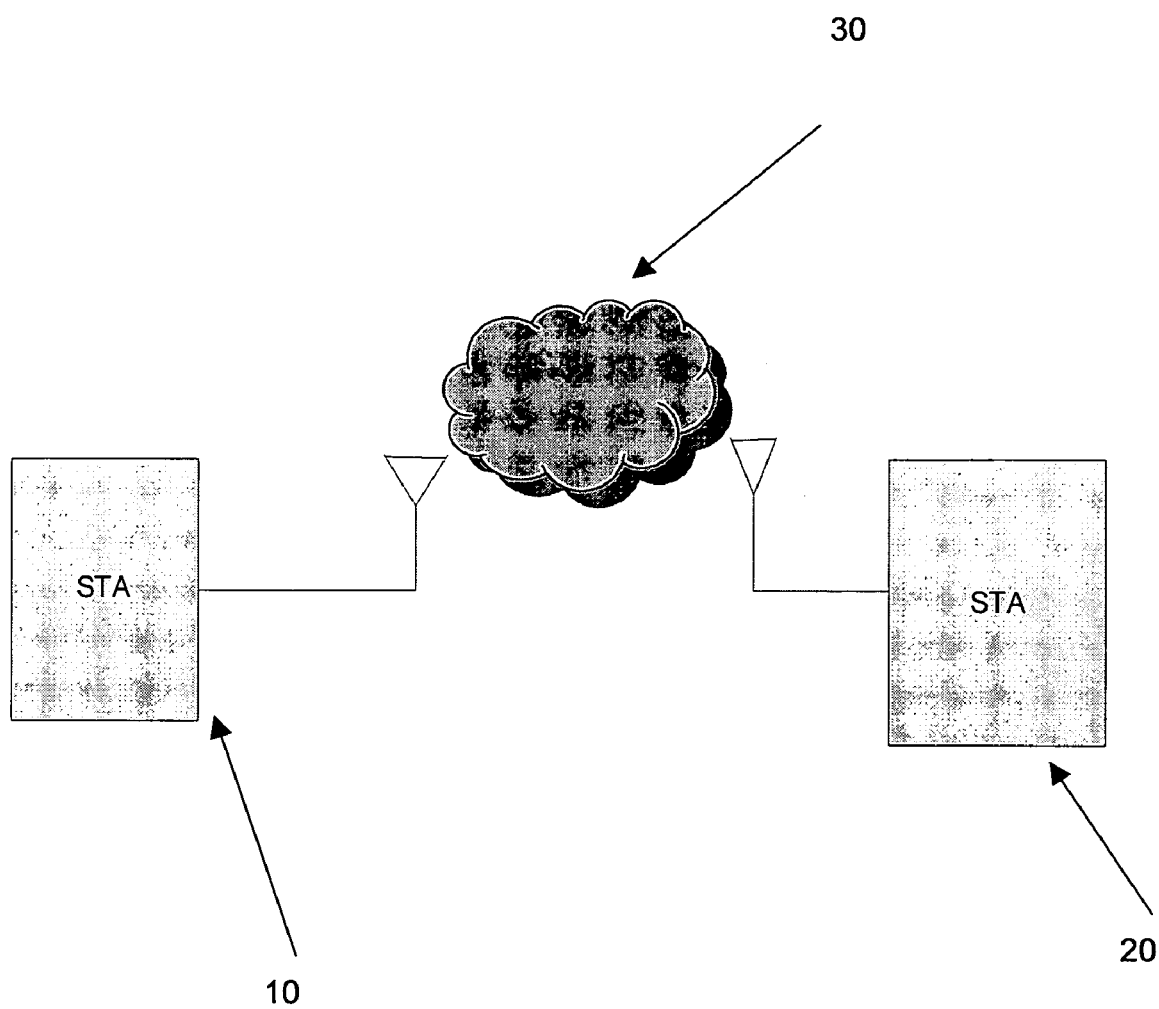
FIG. 1 is a block diagram of a WLAN station receiving data packet from another station within the same IBSS in accordance with the present invention.
Figure 2:
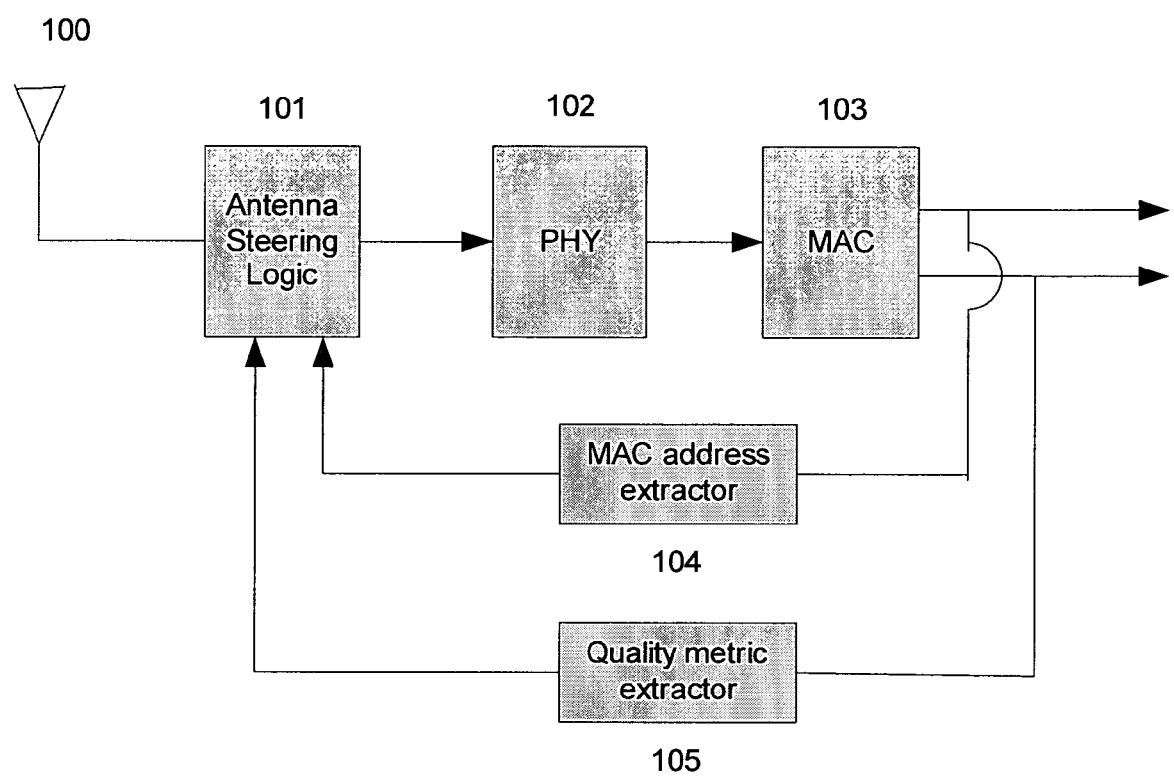
FIG. 2 is a top layer block diagram of a WLAN receiver employing smart-antenna steering logic in accordance with the present invention.

One embodiment example is depicted in FIG. 2, where the packet is 802.11 wireless LAN data frame type received by the station 20 employing the steering method in accordance with the present invention from another station 10 within the same independent basic service set (IBSS), via a wireless media 30 as shown in FIG. 1. The DA, SA and BSSID are embedded in the MAC header. Each distinct combination of DA, SA and BSSID represents a wireless media between the source and destination stations.

Each station 10, 20 may be an access point, a communications device or a base station, for example. Each station 10, 20 includes a switched beam antenna for generating a plurality of antenna beams, a beam selector connected to said switched beam antenna for selecting one of the plurality of antenna beams, and a transceiver connected to the switched beam antenna and to the beam selector for receiving signals from the plurality of transmitters operating within the WLAN. As will be explained in greater, the transceiver further comprises a number of different modules for supporting the steering algorithm in accordance with the present invention.

The steering algorithm accesses and uses MAC layer information including the source and destination MAC addresses of the frames (packets) of the IEEE 802.11 standard WLAN Management frame type. This information includes the Beacon frames, the Probe Request frames, the Probe Response frames, the Authentication frames, the De-authentication frames, the Association Request Frames, the Association Response Frames, the Re-association Request Frames, the Re-association Response frames, and the Disassociation Frames.

The steering algorithm accesses and uses the directly available MAC layer information to search the optimum antenna beam from the available antenna beams for data reception. The available MAC layer information includes the Received Signal Strength Indicator (RSSI) values reported from the IEEE 802.11 WLAN Physical Layer Convergence Protocol (PLCP) header part of each individual 802.11 WLAN MAC packets received by the station; the received packet RATE values indicating the transmission rate by which the current individual MAC packet just received by the station employing the steering method was transmitted by its sender; the LENGTH values indicating the number of bytes contained in the data part of the MAC packet in each of the individual received packets; and the values of various IEEE 802.11 WLAN MAC layer counters referred to in the IEEE 802.11 standard as the dot11 counters, relevant to packets received from other stations. The packets referred to herein include packets or frames of all defined types and sub-types in the IEEE 802.11 WLAN standards.

The steering algorithm accesses and uses the available antenna beams for receive antenna steering. MAC layer information such as the received packet-error rates (and, conversely, packet success rates), the average PHY transmission rates of received frames, and the average short-term throughput of the data-part of the received MAC packets specific to certain source MAC source addresses.

Figure 3:
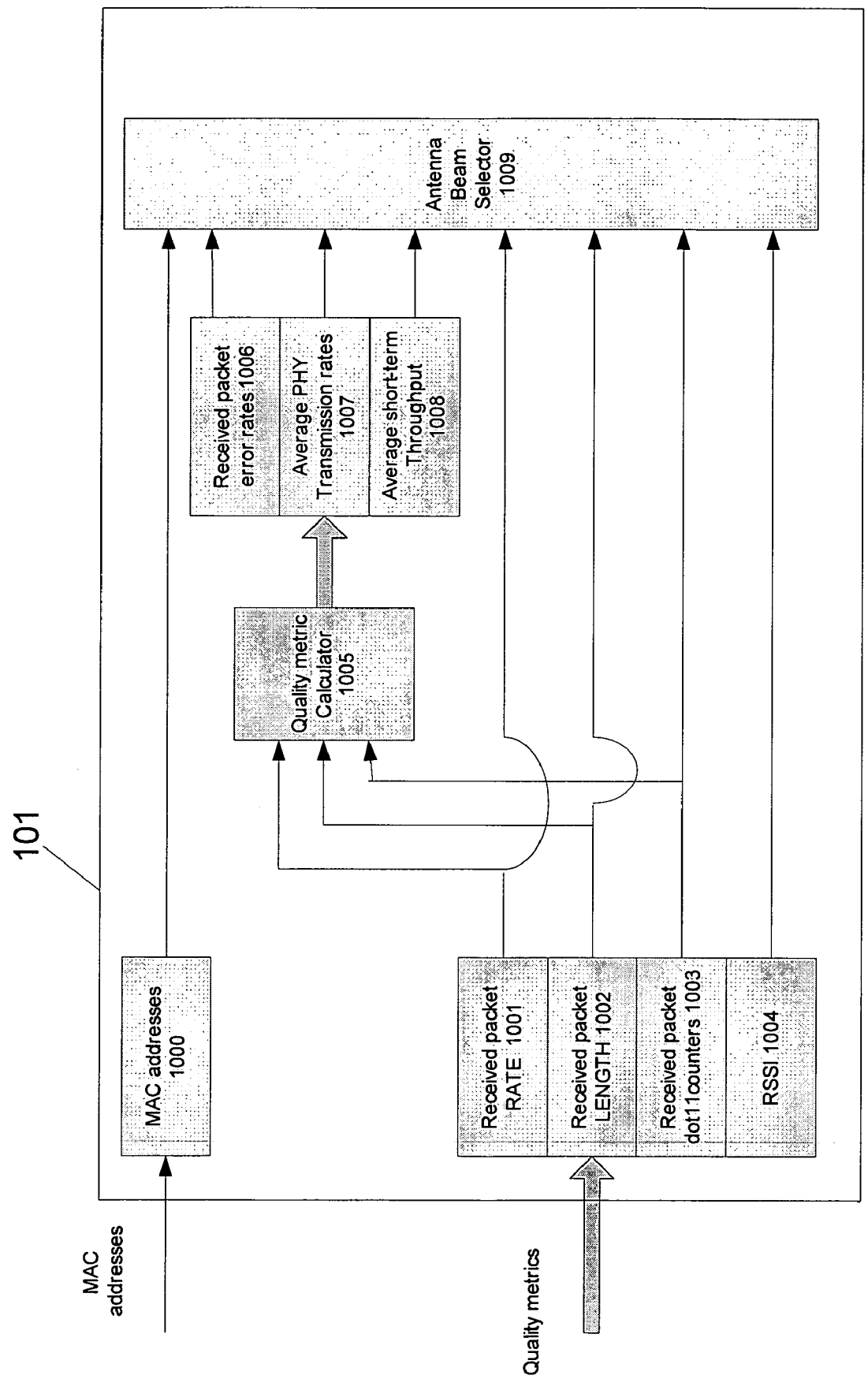
FIG. 3 is a block diagram illustrating receive antenna steering logic in accordance with the present invention.

One embodiment of the antenna steering logic shown in FIG. 2 is further depicted in FIG. 3. The quality metrics passed from the MAC layer include Received Signal Indicator (RSSI) 1004, the transmitted-packet PHY RATE values 1001 indicating the transmission rate by which the current individual MAC packet was transmitted by the station employing the steering method in accordance with the present invention, and the transmitted-packet LENGTH values 1002 indicating the number of bytes contained in the data part of the MAC packet in each of the individual packets transmitted by the station employing the steering method in accordance with the present invention, and the values of various 802.11 wireless LAN MAC-layer counters 1003 (referred to in the 802.11 standard as the dot11 counters) relevant to packets transmitted by the station that employs the steering method of this invention, which are all directly available in MAC header.

The transmitted-packet PHY RATE values 1001, the transmitted-packet LENGTH values 1002 and the values of various 802.11 wireless LAN MAC-layer counters 1003 are passed to a Quality metric calculator 1005, which generates derivative quality metrics including received packet-error rates (and, conversely, packet success rates) specific to certain source MAC addresses, the average PHY transmission rates of received frames specific to certain source MAC addresses, and the average short-term throughput of the data-part of the received MAC packets specific to certain source MAC source addresses.

Both derivative quality metrics and directly available quality metrics, along with corresponding MAC addresses are passed to an Antenna beam selector 1009 where the best antenna beam is determined for communication based on available information. The receive antenna beam selector 1009 may use one or more quality metrics and a corresponding MAC address to steer receive antenna beam. In one embodiment example, antenna beam selector 1009 may use receive the RSSI 1004 of all received packets from a WLAN station with a certain MAC address as the only quality metric.

The steering algorithm accesses and uses the available MAC layer information to search the optimum antenna beam from the available antenna beams for data transmission. The available MAC layer information includes the transmitted packet PHY RATE values indicating the transmission rate by which the current individual MAC packet is transmitted by the station employing the steering method; the transmitted-packet LENGTH values indicating the number of bytes contained in the data part of the MAC packet in each of the individual packets transmitted by the station employing the steering method; and the LENGTH values of various IEEE 802.11 WLAN MAC layer counters relevant to packets transmitted by the station that employs the steering method.

The steering algorithm accesses and uses MAC layer information that includes the transmitted packet-error rates, the average PHY transmission rates of transmitted packets, and the average short-term throughput of the data-part of the transmitted MAC packets specific to certain destination MAC destination addresses.

Figure 4:
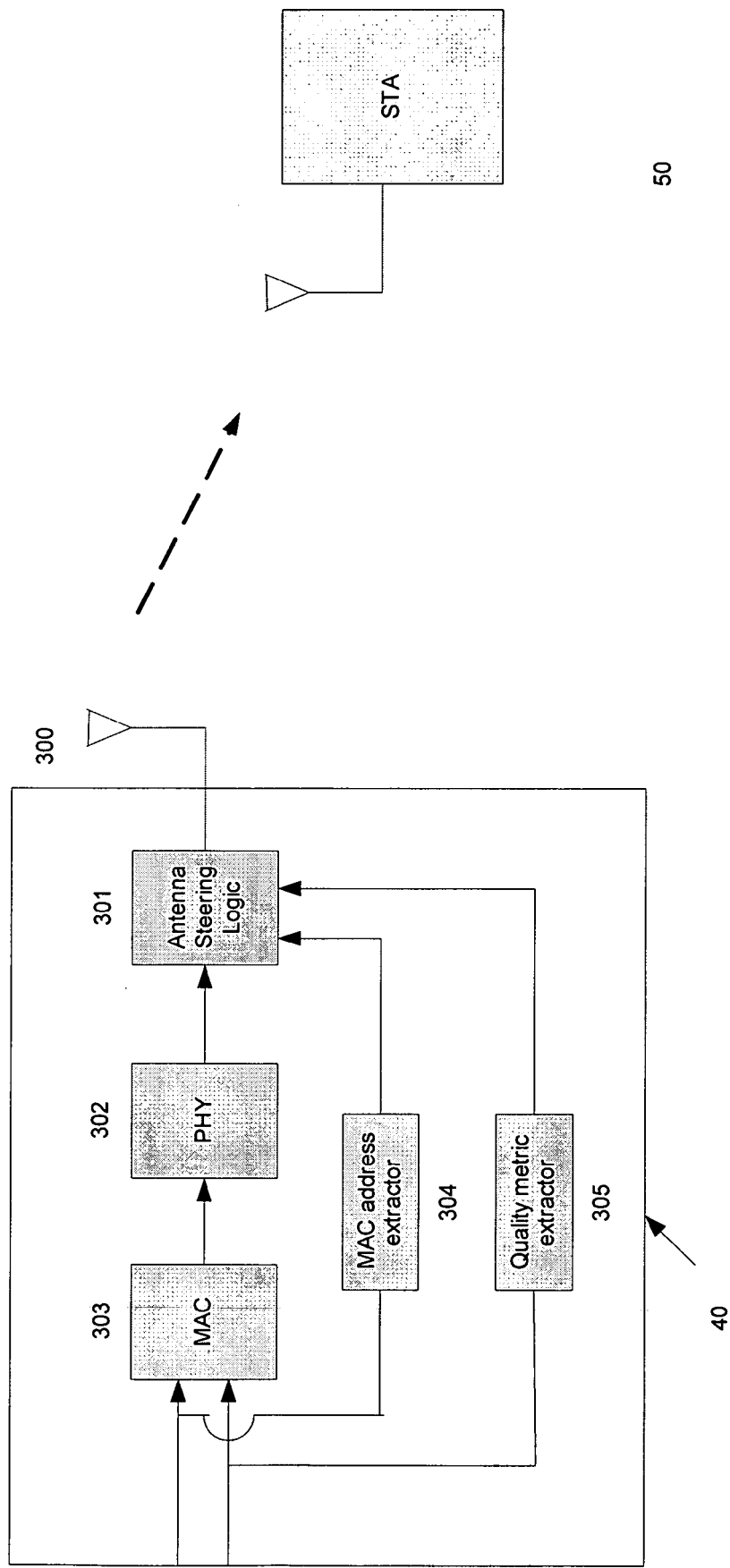
FIG. 4 is a block diagram of a WLAN station employing a smart antenna transmit steering method in accordance with the present invention.

FIG. 4 depicts another embodiment example where the WLAN station 40 employing the steering method for transmitting data type packets to its desired destination station 50. MAC destination addresses are extracted by a MAC address extractor 304, and quality metrics are extracted by a quality metric extractor 305. The extracted quality metrics and MAC destination addresses are associated together and sent to antenna steering logic 301, which determines the best transmit antenna beam for communication with the destination station with certain MAC address. MAC data are reformatted into a proper frame, and modulated by WLAN station PHY 302, and transmitted via a predetermined antenna beam 300.

Figure 5:
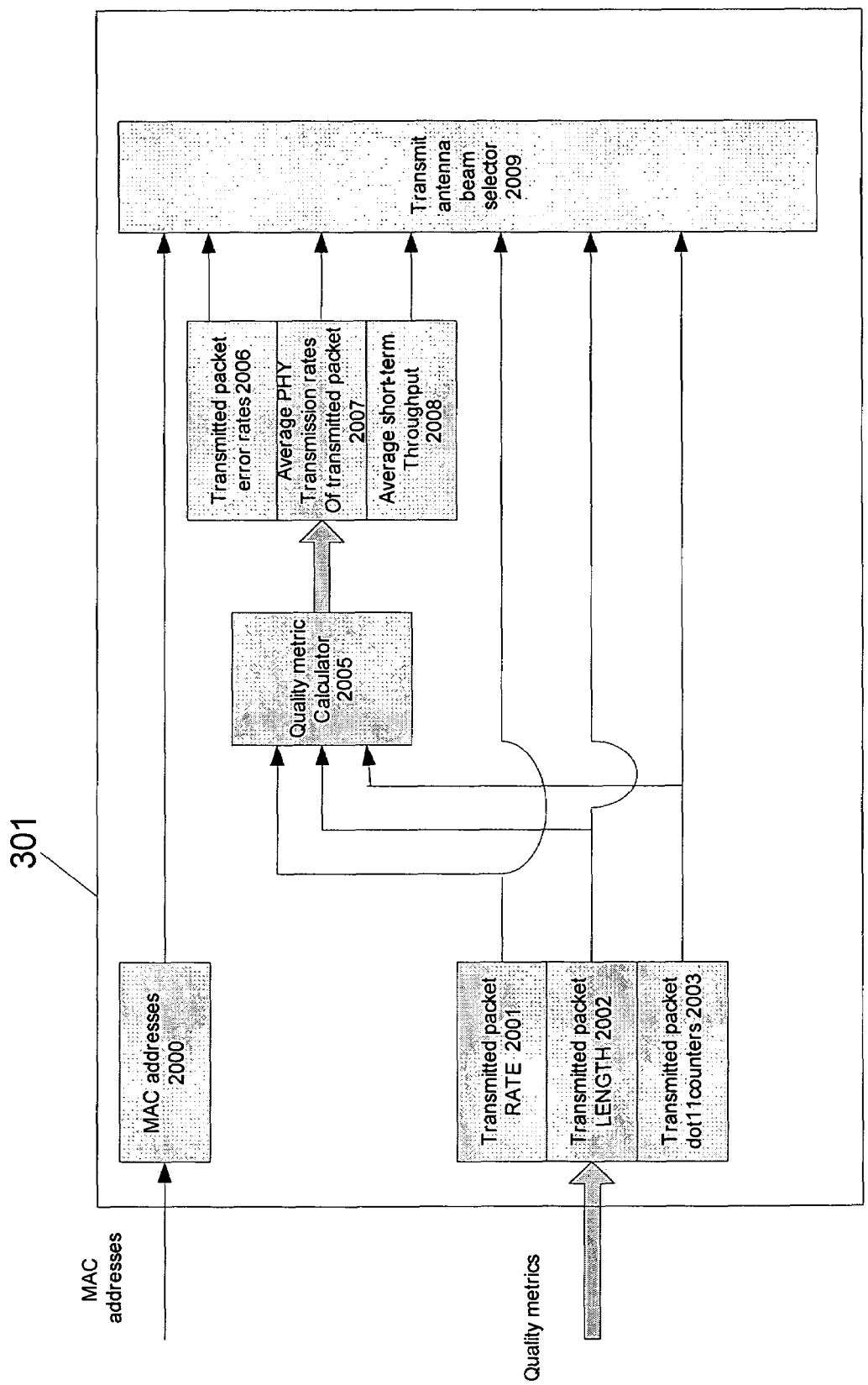
FIG. 5 is a block diagram illustrating a transmit antenna steering logic in accordance with the present invention.

The transmit antenna steering logic of FIG. 4 is further depicted in FIG. 5. The quality metrics passed from the MAC layer include directly available MAC layer information such as the transmitted-packet PHY RATE values 2001 indicating the transmission rate by which the current individual MAC packet was transmitted by the station employing the steering method, and the transmitted-packet LENGTH values 2002 indicating the number of bytes contained in the data part of the MAC packet in each of the individual packets transmitted by the station employing the steering method, and the values of various 802.11 wireless LAN MAC-layer counters 2003 (referred to in the 802.11 standard as the dot11 counters) relevant to packets transmitted by the station that employs the steering method.

The transmitted-packet PHY RATE values 2001, the transmitted-packet LENGTH values 2002 and the values of various 802.11 wireless LAN MAC-layer counters 2003 are passed to a Quality metric calculator 2005, which calculates derivative quality metrics including transmitted packet-error rates 2006 (and conversely, packet success rates) specific to certain destination MAC addresses, the average PHY transmission rates of transmitted packets 2007 specific to certain destination MAC addresses, and the average short-term throughput 2008 of the data-part of the transmitted MAC packets specific to certain destination MAC destination addresses.

Both derivative quality metrics and directly available quality metrics, along with corresponding MAC addresses are passed to a transmit antenna beam selector 2009 where the best transmit antenna beam is determined for communication with a station with a certain MAC address based on available information. The transmit antenna beam selector 2009 may use one or more quality metrics and a corresponding MAC address to steer a transmit antenna beam. In one embodiment example, antenna beam selector 2009 may use an average short-term transmit throughput as the only quality metric.

The steering method identifies, categorizes, and monitors the desired sources and/or desired destinations, using the MAC address information of received and/or transmitted MAC packets, and to identify, categorize, and monitor the undesired sources and/or undesired destinations by using MAC address information of the received and/or transmitted MAC packets.

When the WLAN station that employs the smart-antenna steering method communicates with more than one station, it can identify quality metrics associated with each of those stations, monitor the status of those stations, and categorize those stations into desired sources/destinations, and undesired sources/destinations. Depending upon the actual environment (e.g., geometry location of stations), the smart-antenna steering station may choose either to maximize the energy to/from the desired station, or minimize the energy to/from the undesired station.

Figure 6:
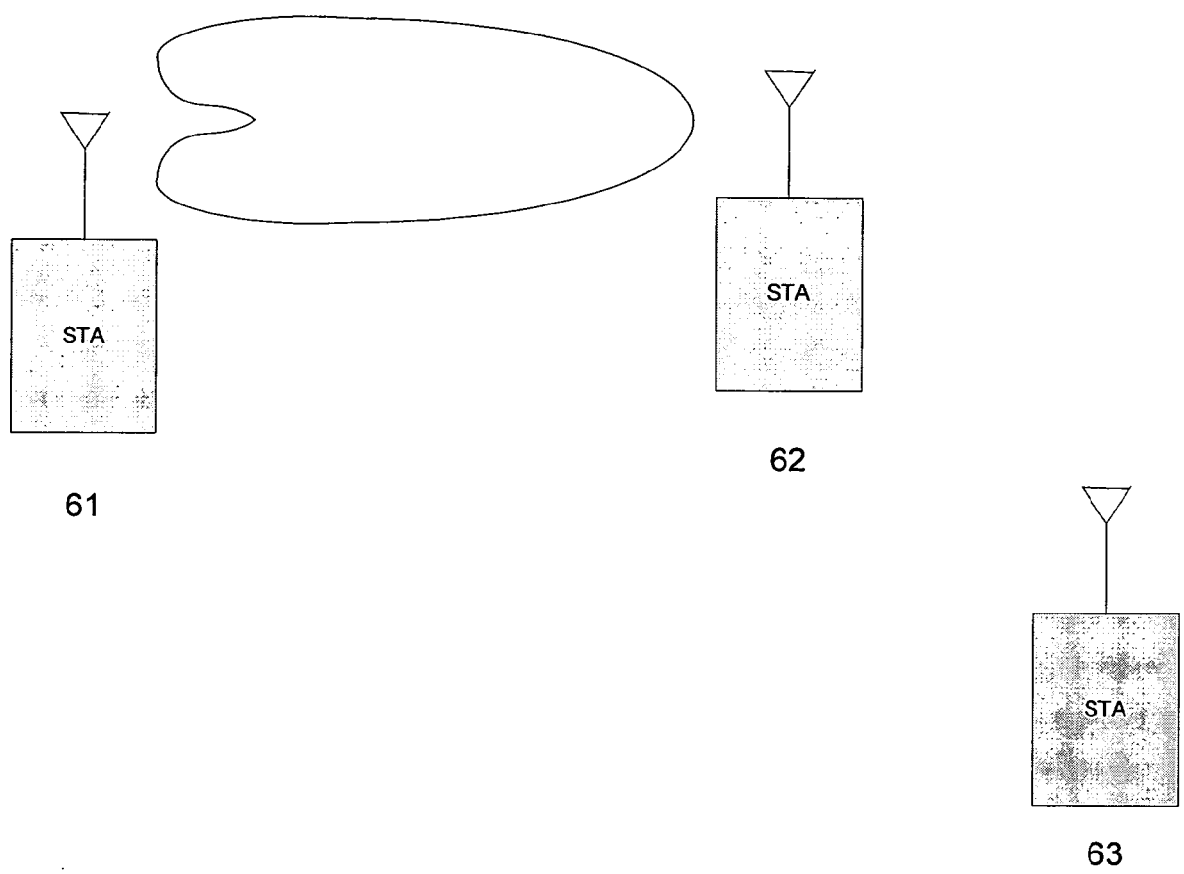
FIG. 6 is a block diagram of a client station receiving signals from two AP stations from similar directions in accordance with the present invention.

The ultimate goal is to maximize a signal to interference and noise ratio (SINR), which leads to a higher throughput. FIG. 6 depicts an embodiment example where the smart-antenna steering client station 61 receives a signal from AP station 62 and AP station 63. The station 62 and station 63 are located in the similar direction relative to station 61, and station 62 is closer than station 63 to station 61. The smart-antenna steering station 61 may steer a receive antenna beam to station 62 as if station 63 did not exist.

Figure 7:
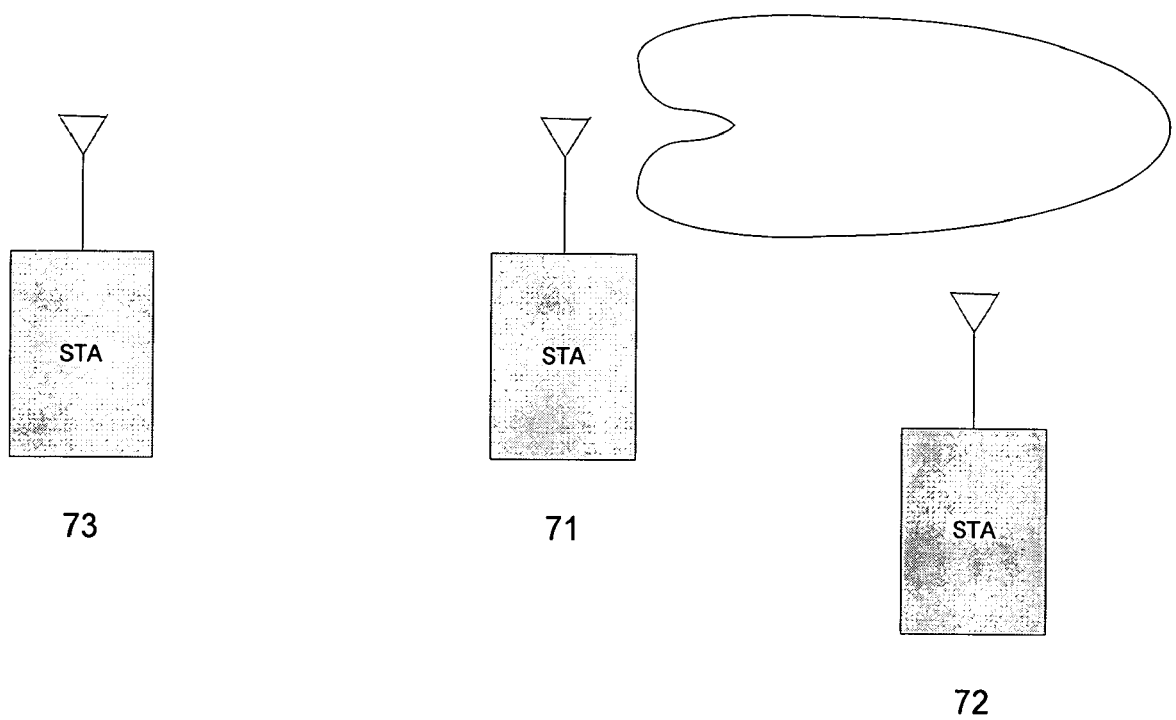
FIG. 7 is a block diagram of a client station receiving signals from two AP stations from opposite directions in accordance with the present invention.

Another embodiment is depicted in FIG. 7, where the smart-antenna steering client station 71 receives a signal from AP station 72 and AP station 73. The station 72 is located in a direction close to an opposite direction of station 73 relative to station 71, and the distance between station 72 and 71 is less than that between the station 73 to station 71. The smart-antenna steering station 71 may steer a receive antenna beam to minimize the energy from station 73. Minimizing the station 73 energy equivalently minimizes interference received by station 71, and results in a maximum SINR.

An alternative way to steer beam antennas is to use performance information provided by layers that are higher than the MAC layer in searching for the best antenna beams. For example, when a Transport Control Protocol (TCP) is used in file transfers over the WLAN, the receiving station with a smart antenna system can rotate its beams for relatively long measurement periods for each of the scanned beams, and during the measurement intervals for each of the beams the system takes measurement of TCP layer or application layer data throughput obtained using that particular beam.

This approach mitigates the problem of potentially steering the beams to an interfering source by steering the antennas solely based on physical layer signal strength. However, such an approach would require excessively long measurement intervals compared to the MAC layer packet-wise scanning of the current invention, since it typically takes much longer time compared to MAC packet-wise measurements.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for operating a communications device in a wireless local area network (WLAN) comprising a plurality of transmitters, the communications device comprising a switched beam antenna for generating a plurality of antenna beams, the method comprising:

receiving signals from the plurality of transmitters operating within the WLAN;
identifying the received signals comprising medium access control (MAC) information;
determining a quality metric for each received signal comprising MAC information;
selecting a transmitter based on the quality metrics;
scanning the plurality of antenna beams for receiving from the selected transmitter the signals comprising MAC information, and determining a quality metric associated with each scanned antenna beam; and
selecting one of the scanned antenna beams for communicating with the selected transmitter based on the quality metrics.

2. A method according to claim 1 wherein the MAC information is included within a packet, the MAC information comprising for each packet a source address and a destination address.

3. A method according to claim 2 further comprising associating the selected antenna beam with the source address of the selected transmitter so that when a subsequent packet is received with the same source address, the same antenna beam is used to receive the MAC information.

4. A method according to claim 1 further comprising:
periodically scanning the plurality of antenna beams for receiving from the non-selected transmitters the signals comprising MAC information, and determining a quality metric associated with each scanned antenna beam;
comparing the quality metrics associated with the non-selected transmitters to the quality metric associated with the selected transmitter; and
selecting one of the scanned antenna beams based on the comparing for communicating with one of the non-selected transmitters.

5. A method according to claim 1 further comprising:
identifying the transmitters not providing signals comprising MAC information; and
avoiding selection of antenna beams in a direction of the identified transmitters not providing signals comprising MAC information.

6. A method according to claim 1 wherein determining the quality metric for each received signal is based on the MAC information associated therewith, the MAC information comprising at least one of a received signal strength indicator (RSSI) value, a received packet RATE value indicating a transmission rate by which the signal was transmitted, a LENGTH value indicating a number of bytes contained in a data part of the signal, and a value of a dot11 counter.

7. A method according to claim 1 wherein determining the quality metric for each received signal is based on the MAC information associated therewith, the MAC information comprising at least one of a received packet-error rate, a packet success rate, an average PHY transmission rate of received frames, and an average short-term throughput of a data part of the signal.

8. A method according to claim 1 wherein the plurality of antenna beams comprises a plurality of directional antenna beams.

9. A method according to claim 1 wherein the plurality of antenna beams comprises a plurality of directional antenna beams and an omni-directional antenna beam, with the omni-directional beam being used for identifying the received signals comprising MAC information, and a directional antenna beam being used for communicating with the selected transmitter.

10. A communications device for operating in a wireless local area network (WLAN) comprising a plurality of transmitters, the communications device comprising:
- a switched beam antenna for generating a plurality of antenna beams;
- a beam selector connected to said switched beam antenna for selecting one of said plurality of antenna beams;
- a transceiver connected to said switched beam antenna and to said beam selector for receiving signals from the plurality of transmitters operating within the WLAN, said transceiver comprising
  - a medium access control (MAC) module for identifying the received signals comprising MAC information, and
  - a quality metric module for determining a quality metric for each received signal comprising MAC information;
- said beam selector for selecting a transmitter based on the quality metrics, and for scanning the plurality of antenna beams for receiving from the selected transmitter the signals comprising MAC information;
- said quality metric module for determining a quality metric associated with each scanned antenna beam; and
- said beam selector for selecting one of the scanned antenna beams for communicating with the selected transmitter based on the quality metrics.

11. A communications device according to claim 10 wherein the MAC information is included within a packet, the MAC information comprising for each packet a source address and a destination address.

12. A communications device according to claim 11 wherein said transceiver associates the selected antenna beam with the source address of the selected transmitter so that when a subsequent packet is received with the same source address, the same antenna beam is used to receive the MAC information.

13. A communications device according to claim 10 wherein said beam selector periodically scans the plurality of antenna beams for receiving from the non-selected transmitters the signals comprising MAC information; wherein said quality metric module determines a quality metric associated with each scanned antenna beam, and compares the quality metrics associated with the non-selected transmitters to the quality metric associated with the selected transmitter; and wherein said beam selector selects one of the scanned antenna beams based on the comparing for communicating with one of the non-selected transmitters.

14. A communications device according to claim 10 wherein said MAC module identifies the transmitters not providing signals comprising MAC information; and wherein said beam selector avoids selection of antenna beams in a direction of the identified transmitters not providing signals comprising MAC information.

15. A communications device according to claim 10 wherein said transceiver further comprises:
- a signal strength indicator (RSSI) module for determining a received signal strength for each received signal;
- a RATE module for determining a received packet RATE value indicating a transmission rate by which each signal was transmitted;
- a LENGTH module for determining a LENGTH value indicating a number of bytes contained in a data part of each signal;
- a counter for counting a received number of packets for each signal; and
- wherein said quality metric module determines the quality metric for each received signal based on the MAC information associated therewith, the MAC information comprising at least one of the received RSSI value from said RSSI module, the received packet RATE value from said RATE module, the LENGTH value from said LENGTH module, and the value of said counter.

16. A communications device according to claim 10 wherein said transceiver further comprises:
- a received packet-error rate module for determining an error rate of received packets for each signal;
- a packet success rate module for determining a success rate of received packets for each signal;
- a transmission rate module for determining an average PHY transmission rate of received frames for each signal;
- a throughput module for determining an average short-term throughput of a data part for each signal;
- wherein said quality metric module determines the quality metric for each received signal based on the MAC information associated therewith, the MAC information comprising at least one of the received packet-error rate, the packet success rate, the average PHY transmission rate of the received frames for each signal, and the average short-term throughput of a data part for each signal.

17. A communications device according to claim 10 wherein the plurality of antenna beams comprises a plurality of directional antenna beams.

18. A communications device according to claim 10 wherein the plurality of antenna beams comprises a plurality of directional antenna beams and an omni-directional antenna beam, with the omni-directional beam being used for identifying the received signals comprising MAC information, and a directional antenna beam being used for communicating with the selected transmitter.

* * * * *